United States Patent
Kirkhart et al.

[11] Patent Number: 6,052,646
[45] Date of Patent: Apr. 18, 2000

[54] VEHICLE NAVIGATION SYSTEM WITH IMPROVED POWERUP PERFORMANCE

[75] Inventors: Michael O. Kirkhart, Warren; Larry E. Spencer, II, Lake Orion, both of Mich.

[73] Assignee: Magellan DIS, Inc., Rochester Hills, Mich.

[21] Appl. No.: 09/060,899

[22] Filed: Apr. 15, 1998

[51] Int. Cl.[7] .................. G06F 7/78; G06F 15/50
[52] U.S. Cl. .............. 701/213; 701/209; 701/210; 701/211; 701/22; 701/53; 701/215
[58] Field of Search ..................... 701/213, 210, 701/209, 211, 215, 22, 53

[56] References Cited

U.S. PATENT DOCUMENTS

| | | | |
|---|---|---|---|
| 4,531,123 | 7/1985 | Tagami et al. | |
| 4,651,127 | 3/1987 | Mayer | 340/52 E |
| 4,733,100 | 3/1988 | Nusairat et al. | 307/9 |
| 5,073,721 | 12/1991 | Terrill et al. | 307/10.7 |
| 5,094,199 | 3/1992 | Griffin | 123/179.1 |
| 5,222,245 | 6/1993 | Ando et al. | |
| 5,307,048 | 4/1994 | Sonders | 340/426 |
| 5,418,537 | 5/1995 | Bird | |
| 5,592,173 | 1/1997 | Lau et al. | 342/357.12 |
| 5,788,326 | 8/1998 | Kawade et al. | 297/236 |
| 5,815,824 | 9/1998 | Saga et al. | 701/22 |
| 5,848,376 | 12/1998 | Steiner et al. | 701/213 |
| 5,892,346 | 4/1999 | Moroto et al. | 318/587 |
| 5,922,042 | 7/1999 | Sekine et al. | 701/210 |

FOREIGN PATENT DOCUMENTS

| | | |
|---|---|---|
| 0701196 | of 1996 | European Pat. Off. |
| 6341851 | of 1994 | Japan. |

*Primary Examiner*—William A. Cuchlinski, Jr.
*Assistant Examiner*—Olga Hernandez
*Attorney, Agent, or Firm*—Howard & Howard

[57] ABSTRACT

A navigation system includes a driver presence sensor and engine running detection circuitry. When the detection circuitry determines that the engine of the vehicle is not running, the navigation system enters a low power mode. When the presence of the driver is detected, the navigation system begins power up, switching from a low power to a full power operational mode. If the detection circuitry does not determine that the engine is running within a predetermined time period, the navigation system reenters the low power mode. The detection circuitry monitors the vehicle's electrical system and determines that the engine is running when an AC content exceeds a predetermined threshold.

13 Claims, 2 Drawing Sheets

VEHICLE NAVIGATION SYSTEM WITH IMPROVED POWERUP PERFORMANCE

BACKGROUND OF THE INVENTION

The present invention relate generally to vehicle navigation systems and more particularly to a vehicle navigation system with improved startup performance.

Known vehicle navigation systems generally include a plurality of motion and position determining devices, such as a GPS receiver, accelerometers, gyros, wheel speed sensors, etc. The navigation system further includes a CPU receiving data from all of the sensors and having a hard drive containing a database of roads which may be traveled by the vehicle. As is generally known, the navigation system determines the position of the vehicle relative to the database of roads and displays the current position of the vehicle on a display. Further, the driver can select a destination relative to the database of roads. The navigation system then displays turn-by-turn instructions to the driver to guide the driver to the selected destination.

In order to conserve battery power, navigation systems generally enter a "low power" mode when the vehicle engine is not running. In low power mode, the hard drive is not spinning, the CPU is not booted, the sensors do not consume power and the GPS receiver does not receive GPS signals. To determine whether the engine is running, the current systems are connected to the "ON" position of the vehicle ignition switch. When the ignition switch is turned to the ON position, the navigation system switches from low power mode to fill power mode. At that time, the hard drive in the navigation system starts spinning, the CPU is booted, the motion sensors begin to warmup and stabilize, and the GPS receiver receives GPS signals and begins calculating a GPS position solution. This "warmup" period by the navigation system components requires time during which the driver of the vehicle may be taking other actions that the navigation system needs to monitor in order to know the current position of the vehicle. It would be difficult and undesirable to force the vehicle to remain still while the navigation system is in the warmup period. In cold weather, this warmup period could be 30 seconds or more.

Additionally, startup performance of the navigation system is closely related to the GPS receiver's "time to first fix." To minimize this time, it is important for the GPS receiver to have fresh satellite ephemeris data. This data, which is used to determine the precise location of the GPS satellites, typically needs to be refreshed at least every four hours. If the vehicle is parked for more than four hours, the GPS receiver must first obtain fresh ephemeris data before calculating an accurate position solution. This further delays the startup performance of the vehicle navigation system.

SUMMRAY OF THE INVENTION

The present invention provides a vehicle navigation system having improved powerup performance. The vehicle navigation system includes a sensor for detecting the presence of the driver, such as a motion sensor. When the sensor determines that the driver is present, the navigation system enters the warmup period, switching from low power mode to full power mode. The hard drive starts spinning, the CPU is booted, the sensors begin warmup and the GPS receiver and CPU begin calculating a GPS position solution. By the time the driver enters the vehicle and starts the car, the navigation system is operational.

If the presence of the driver is detected, but the vehicle engine is not running within a predetermined time period, the navigation system returns to the low power mode. This reduces power consumption in the event of a false detection of the driver's presence, or if the driver did not start the vehicle.

The vehicle navigation system can monitor the ignition switch of the vehicle to determine if the engine is running within the time period; however, preferably the vehicle navigation system includes engine running detection circuitry which simply monitors the power supply from the vehicle to the vehicle navigation system. The engine running detection circuitry monitors the electrical power supply of the vehicle. When the engine is not running, the voltage of the vehicle power supply is a fairly constant DC voltage, typically 12 to 14 volts. When the engine is running, there is a measurable AC voltage superimposed on the DC power supply output. The AC voltage is a result of transients generated by the ignition system primary circuit and charge of pulses from the generator/alternator.

Generally, the engine running detection circuitry monitors the amplitude of the AC content. The engine running detection circuitry may use both time and frequency domain techniques to monitor the AC content in the vehicle power supply. When the AC content exceed a predetermined threshold, the engine running detection circuitry determines that the engine is running. When the AC content falls below the predetermined threshold, the engine running detection circuitry determines that the engine is not running. If the engine running detection circuitry determines that the engine is not running within a predetermined time period after the presence of the driver has been detected, the navigation system reenters the low power standby mode. While the engine is running, the navigation system continues to operate at full power. When the engine running detection circuitry determines that the engine is not running for a predetermined time period, the navigation system enters the low power standby mode.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
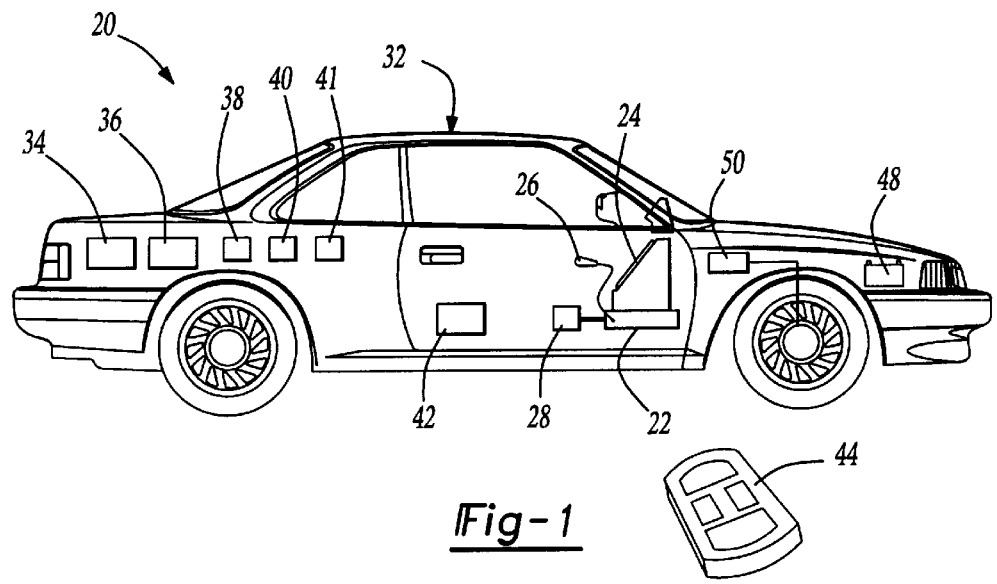
FIG. 1 is a schematic of the navigation system of the present invention installed in the vehicle.

The navigation system 20 of the present invention is shown schematically in FIG. 1. The navigation system 20 includes a CPU 22 connected to a display 24, such as a high resolution LCD or flat panel display. The CPU 22 is also connected to an input device 26 such as a mouse, keyboard, key pad or remote device. Alternatively, the display 24 can be a touch screen display. The navigation system 20 further includes a storage device 28, such as a hard drive 28 or CD ROM, connected to the CPU 22. The storage device 28 contains a database including a map of all the roads in the area to be traveled by the vehicle 32 and may contain the software for the CPU 22, including the graphical user interface, route guidance, operating system, position-determining software, etc.

The navigation system 30 preferably includes position and motion determining devices, such as a GPS receiver 34, a gyroscope 36, a compass 38, a wheel speed sensor 40 and an orthogonal multiple axis accelerometer 41 all connected to the CPU 22 (connections not shown for simplicity). Such position and motion determining devices are well known and are commercially available. A vehicle security system 42, preferably including a remote entry system having a remote 44, is installed in the vehicle 32. Generally, the components described above are powered by the vehicle's electrical system, which preferably includes the vehicle battery 48.

The navigation system 20 further includes detection circuitry 50 connected to the vehicle's electrical system or battery 48 and sending a signal to the CPU 22. Although the detection circuitry 50 is shown as a separate component, it could be located on the CPU 22.

The navigation system 20 determines the position of the vehicle 32 relative to the database of roads utilizing the position and motion determining devices. The driver selects a destination relative to the database of roads utilizing the user input device 26 and the display 24. The navigation system 20 then displays turn-by-turn instructions to the driver to guide the driver to the desired destination from the present position.

Figure 2:
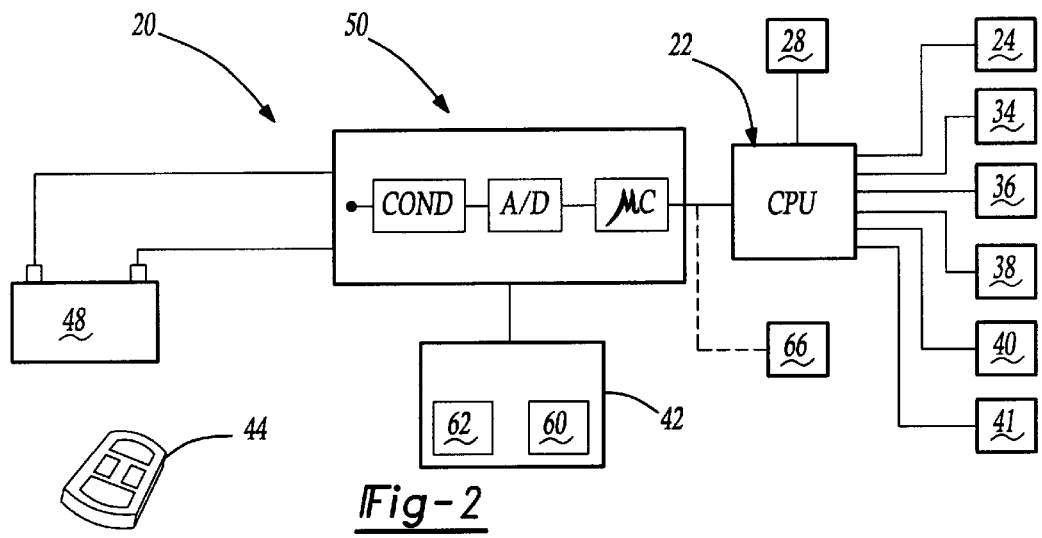
FIG. 2 is a lower level schematic of the navigation system of FIG. 1.

FIG. 2 is a lower level schematic of the navigation system 20 of the present invention. As can be seen in FIG. 2, the detection circuitry 50 generally comprises conditioning circuitry 52, which will be described in more detail below, an analog to digital converter 54 and a microcontroller 56, preferably a Microchip PIC12C671 or PIC12C672. The detection circuitry 50 monitors the voltage on the vehicle electrical system or battery 48. Because the vehicle's electrical system or battery 48 will typically be around 12 to 14 volts DC, the conditioning circuitry 52 filters out the DC component of the power signal from the battery 48 and shifts the voltage to the middle of the range of inputs of the analog to digital converter 54. The microcontroller 56 periodically samples the output from the analog to digital converter 54 to measure the AC content of the power supply signal from the battery 48. Preferably, the microcontroller 56 samples the output from the analog to digital converter 54 every millisecond.

The microcontroller 56 preferably compares the largest peak to peak voltage variation over a one second interval to a predetermined threshold, such as 100 to 300 millivolts. The specific threshold may depend upon the specific vehicle into which the navigation system 20 is installed. Further, the microcontroller 56 may also perform a Fourier or wavelet transform on the sampled AC content and look for signal content at certain frequencies to determine whether the engine is running. Again the spectral analysis of the signal may depend upon the specific vehicle into which the navigation system 20 is installed. Those skilled in the art would be able to adapt the detection circuitry 50 to a specific vehicle by observing the AC content while the engine is running versus not running.

If the detection circuitry determines that the AC content of the power supply signal indicates that the engine is running, the microcontroller 56 generates an engine running signal, indicating that the engine is running. If the AC content of the power supply signal does not exceed the predetermined threshold, the detection circuitry 50 determines that the vehicle engine is not running, and does not generate an engine running signal.

The detection circuitry 50 may also monitor the vehicle power supply to determine the presence of the driver. When the doors are unlocked using a keyless entry fob, the automatic door lock actuators will generate a transient on the vehicle electrical system that the detection circuitry 50 will detect as a short duration AC signal. Moreover, when the door is opened and the interior lights are turned on, a transient will be generated on the vehicle electrical system which the detection circuitry can recognize. In either event, the detection circuitry 50 determines the presence of the driver approaching or entering the vehicle 32.

The detection circuitry 50 may alternatively receive a signal from the vehicle security system 42 indicating the presence of the driver in or near the vehicle 32. This signal may be generated by a sensor 60 which is part of the vehicle security system 42. As is generally known in vehicle security systems, the sensor 60 may comprise a motion sensor, door pin switches, vibration sensor, noise sensor, or other sensors known in the vehicle security art. Additionally, or alternatively, the presence of the driver may be indicated by the remote entry sensor 62, which may also be integrated with the vehicle security system 42. As is generally known, the remote entry sensor 62 receives an RF or infrared signal from the remote entry remote 44, which is typically carried by the driver. Alternatively, the presence of the driver may be detected by the accelerometer 41 which is part of the navigation system 20.

When the presence of the driver is detected by the detection circuitry 50, either by monitoring the AC content or the vehicle security system 42, the detection circuitry 50 selectively sends a warmup signal to the CPU 22 which may be relayed to the other electrical components 24, 34, 36, 38, 40, 28. Alternatively, as shown in phantom, the detection circuitry 50 can send the warmup signal directly to each of the components, indicated collectively as components 66.

Figure 3:
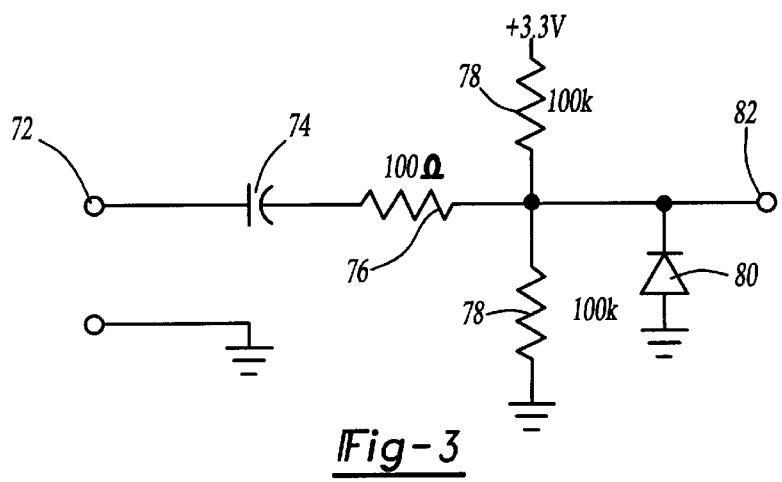
FIG. 3 is a detailed schematic of the conditioning circuitry of FIG. 2.

The conditioning circuitry is shown in more detail in FIG. 3. The conditioning circuitry 52 receives the power supply signal at input 72 and filters out the DC and lower frequency components with capacitor 74 and resistor 76. Capacitor 74 is preferably 0.1 microfarads to 0.2 microfarads. Resistor 76 is preferably 100 Ohms. This places the AC content of the power supply signal at a voltage divider circuit, which comprises two 100k Ohm resistors 78 connected to a 3.3 volt power supply. This places the AC content of the power supply signal in the middle of the range of the analog to digital converter 54 and provides the maximum available peak to peak input voltage swing. A diode 80 may be coupled to the output 82.

Figure 4:
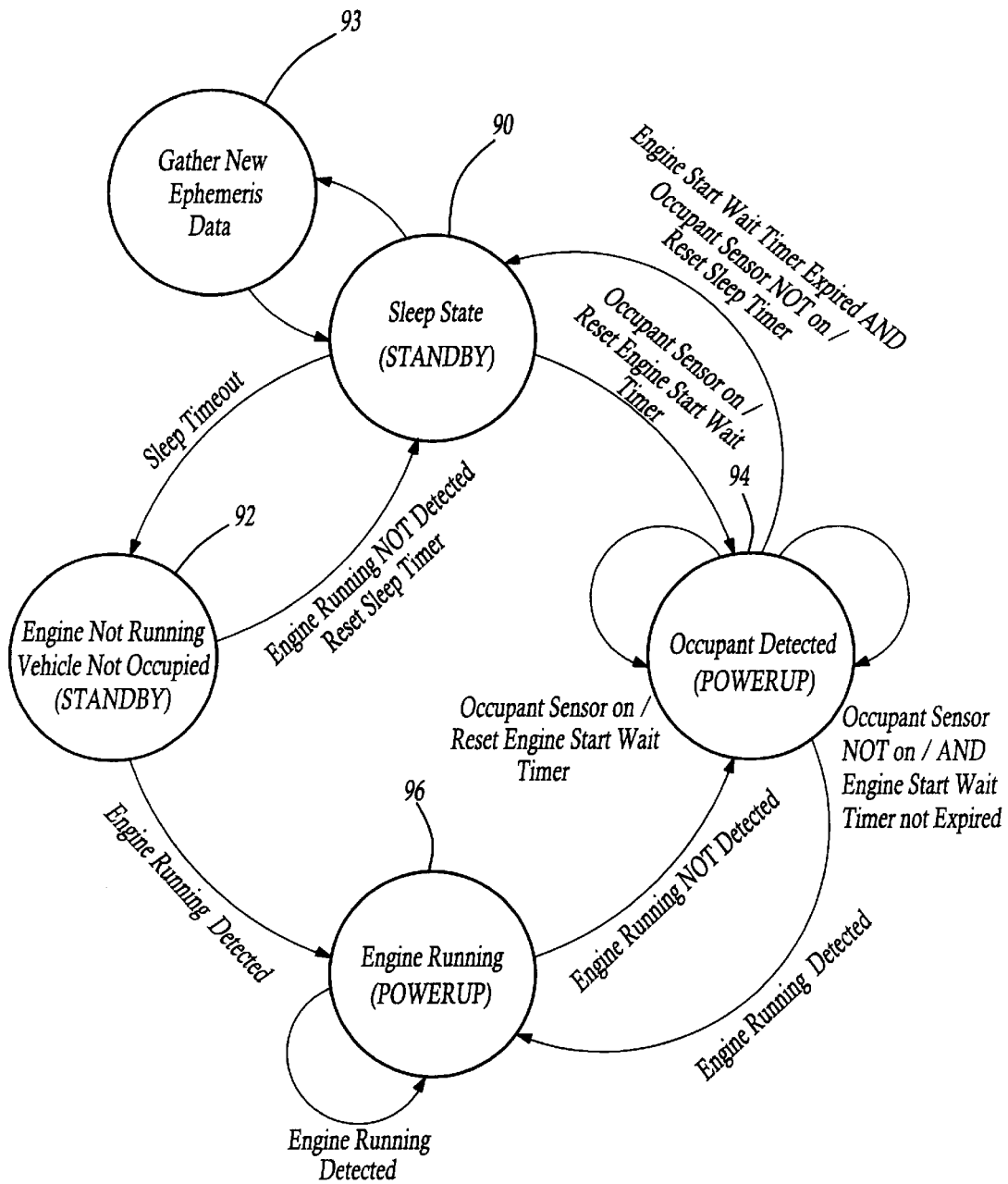
FIG. 4 is a high-level state diagram of the operation of the navigation system of FIG. 1

The operation of the vehicle navigation system 20 will be described by referring to FIG. 2 and a state diagram shown in FIG. 4. When the vehicle engine is not running, the vehicle power supply or battery 48 provides a fairly constant DC voltage, preferably 12 to 14 volts. The DC component of the power supply signal is filtered out by the conditioning circuitry 52 and the peak to peak AC content of the power supply signal does not exceed the predetermined threshold. Therefore, the microcontroller 56 in the detection circuitry 50 determines that vehicle engine is not running, and so indicates to the CPU 22 and other electrical components 24, 28, 34, 36, 38 and 40. These electrical components then enter a low power mode in state 90 to conserve power. As will be recognized, some of these electrical components require some power even in low power mode.

Periodically, (preferably approximately every second) the microcontroller 56 exits low power mode (state 90) and checks whether the engine is running. If the detection circuitry 50 detects that the engine is running, even if the presence of the driver has not be detected, the detection circuitry 50 indicates to the CPU 22 and other electrical components to switch to full power in state 96.

Preferably, the CPU 22 and GPS receiver 34 also switch on briefly every four hours in state 93. In state 93, the GPS receiver 34 collects and stores fresh ephemeris data. The CPU 22 and GPS receiver 34 then reenter low power mode in state 90 for up to four more hours. If the GPS receiver 34 is unable to receive a satellite signal and obtain fresh ephemeris data within a predetermined time period (approximately 90 seconds), the CPU 22 and GPS receiver 34 reenter low power mode in state 90. If the GPS receiver 34 is unable to receive a satellite signal after several tries (such as three or four), the microcontroller 56 does not enter state 93 for additional attempts until after the engine is started. This would indicate that the vehicle 32 may be parked for a long period in a parking structure or at some location where satellite signals cannot be received. The GPS receiver 34 preferably also collects and stores fresh almanac data periodically as well, although it need not be gathered as often, such as once per week.

When the driver approaches the vehicle and activates the remote entry remote 44, the detection circuitry 50 detects the transient generated by the door lock actuators on the vehicle electrical system and generates a warmup signal, which is sent to the CPU 22 and the other electrical components. In state 94, the presence of the driver is detected and the CPU 22 boots up and starts the hard drive spinning 28. The other electrical components begin their warmup period as well. The display 24 switches to a full power mode and warms up in a few seconds. The GPS receiver 34 receives signals from the GPS satellite and may begin calculating a GPS position solution. The other sensors, such as the gyroscope 36, compass 38, and wheel speed sensor 40 begin their warmup period as well, switching to full power. The navigation system 20 is fully operational and can monitor the initial actions taken by the driver by the time the driver enters the vehicle and starts the engine.

When the driver starts the engine, the detection circuitry 50 detects the AC content in the vehicle electrical system or battery 48 and the navigation system 20 enters state 96. The AC content is a result of transients generated by the ignition system primary circuit and charge pulses from the generator/alternator. When a peak to peak voltage exceeding the predetermined threshold, such as 200 millivolts, is detected by the microcontroller 56, the detection circuitry 50 determines that the engine is running and the navigation system 20 remains at full power. If the detection circuitry 50 determines that the engine is not running within a predetermined time period of detecting the presence of the driver, preferably 30 to 90 seconds, the detection circuitry 50 generates a signal to the CPU 22 and other electrical components to reenter low power mode in state 90. If the detection circuitry 50 determines that the vehicle 32 is still occupied (such as by monitoring the accelerometer 41) even though the engine is not running, the navigation system 20 preferably remains at full power for some extended predetermined time period.

The navigation system 20 of the present invention has improved power up performance. The navigation system 20 is powered up earlier, by anticipating its use by sensing the presence of the driver. The navigation system 20 further includes improved detection circuitry 50 for determining whether the engine is running. The detection circuitry 50 for the presence of the driver and the running engine simply monitors the power supply, without the need to connect an extra wire to the ignition switch. Further, the navigation system 20 maintains fresh ephemeris data by periodically exiting sleep mode to receive a satellite signal. The improved navigation system 20 will determine the present position of the vehicle 32 and monitor the initial actions taken by a driver of the vehicle 32 after the engine is started.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A GPS receiver storing satellite ephemeris data, said GPS receiver having a low power mode and a full power mode, said GPS receiver switching from low power mode to full power mode and collecting and storing fresh satellite ephemeris data if a predetermined time has elapsed since said satellite ephemeris data was stored.

2. A method for operating a navigation system for a vehicle including the steps of:

a. maintaining an electrical component of a navigation system in a low power mode when the navigation system is not being utilized and an engine in the vehicle is not running;

b. predicting when said navigation system will be utilized;

c. generating a warmup signal based upon said prediction; and d. switching said electrical component from said low power mode to an operating mode based upon said warmup signal, said steps b–d being performed prior to the engine in the vehicle running.

3. The method for operating a navigation system of claim 2 wherein said step b further includes the step of detecting the presence of a driver of the vehicle.

4. The method for operating a navigation system of claim 2 wherein said step b further includes the step of monitoring an AC content of a vehicle power supply.

5. The method for operating a navigation system of claim 2 wherein said step d further includes the step of staring a hard drive.

6. The method for operating a navigation system of claim 2 wherein said step d further includes the step of deriving a GPS solution.

7. The method for operating a navigation system of claim 2 further including the steps of: storing satellite ephemeris data;

f) switching a GPS receiver from low power mode to full power mode and collecting and storing fresh satellite ephemeris data if a predetermined time has elapsed since said step e).

8. The method for operating a navigation system of claim 2 further including the steps of:

e. detecting whether an engine of the vehicle is running after said warmup signal is generated; and f. returning said electrical component to said low power mode if said engine is not running within a predetermined time period of said warmup signal.

9. The method for operating a navigation system of claim 8 further including the steps of:

detecting the presence of said driver in said vehicle;

remaining in said operating mode after said predetermined time period based upon said detection of said driver in said vehicle.

10. The method for operating a navigation system of claim 8 wherein said step e further includes the step of monitoring an electrical power signal from a vehicle power supply associated with said engine.

11. The method for operating a navigation system of claim 10 wherein said step e further includes the step of monitoring an AC content of said electrical power signal.

12. The method for operating a navigation system of claim 11 wherein said step e further includes the step of comparing said AC content to a predetermined value.

13. The method for operating a navigation system of claim 12 further including the step of switching said electrical component to said low power mode based upon detecting that said engine is not running in step e.

* * * * *